Figure 1:
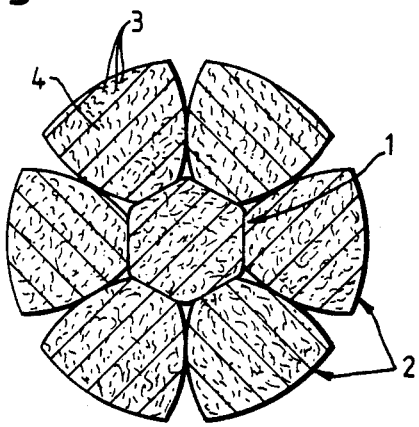

United States Patent [19]
Plessner et al.

[11] Patent Number: 4,709,983
[45] Date of Patent: Dec. 1, 1987

[54] OPTICAL CABLES

[75] Inventors: Karl W. Plessner, Kings Langley; Michael J. Poole, London, both of England

[73] Assignee: BICC public limited company, London, England

[21] Appl. No.: 777,620

[22] Filed: Sep. 19, 1985

[30] Foreign Application Priority Data

Sep. 21, 1984 [GB] United Kingdom ............... 8423985

[51] Int. Cl.$^4$ .................................. G02B 6/44
[52] U.S. Cl. .................................. 350/96.23
[58] Field of Search ............. 174/70 A, 70 R, 113 A, 174/113 C, 116, 131 A; 350/96.23, 96.24; 428/373

[56] References Cited

U.S. PATENT DOCUMENTS 4,365,865 12/1982 Stiles ............................ 350/96.23

FOREIGN PATENT DOCUMENTS 0082067 6/1983 European Pat. Off. .
2505057 11/1982 France .

Primary Examiner—Eugene R. LaRoche
Assistant Examiner—Steven J. Mottola
Attorney, Agent, or Firm—Buell, Ziesenheim, Beck & Alstadt

[57] ABSTRACT

A non-metallic flexible elongate strengthening member suitable for use as a strengthening member of an optical cable comprises a plurality of non-metallic flexible elements helically laid around a central non-metallic flexible element, each of which flexible elements comprises a multiplicity of filaments of non-metallic reinforcing material, e.g. non-optical glass or an aromatic polyamide, bonded together by a heat-softenable organic material, e.g. polypropylene or nylon, and is coated with a release agent, e.g. a film of silicone oil. The flexible elements of the assembly are so deformed and compacted together that any tendency for the flexible elements to spring apart is substantially eliminated.

12 Claims, 2 Drawing Figures

U.S. Patent    Dec. 1, 1987    Sheet 1 of 1    4,709,983

OPTICAL CABLES

This invention relates to optical cables comprising at least one optical cable element for the transmission of light and especially, but not exclusively, to optical cables comprising at least one optical cable element for use in the communications field adapted for transmission of light having a wavelength within the range 0.8 to 1.9 micrometres.

Where an optical cable is to be used in an environment in which the cable is likely to be subjected to a wide range of temperatures, e.g. −40° C. to 80° C., which would cause thermal contraction or thermal stretching of components and/or materials of the cable and hence possible damage to an optical fibre or optical fibres of the cable, it has been proposed to incorporate in the cable at least one elongate strengthening member of such a material and of such a cross-sectional area that it is highly resistant to axial compression and that it will eliminate or reduce at least to a substantial extent the strain that would otherwise be imparted to an optical fibre or optical fibres when the cable is stressed in such a way as to tend to subject an optical fibre or optical fibres to a tensile force.

Elongate strengthening members or steel or other metal or metal alloy have been proposed and used but, in cases where the use of a metal or metal alloy in an optical cable is to be avoided, non-metallic elongate strengthening members have been proposed and employed. One form of non-metallic strengthening member that has been proposed and used is in the form of a rod comprising a multiplicity of non-metallic filaments, e.g. filaments of an aromatic polyamide or glass, bonded together by an epoxy or polyester resin. Such a rod is very stiff if the diameter of the rod exceeds about 3 mm and the use of such rods in an optical cable, not only makes the cable undesirably stiff but, when the cable is wound around a drum, the strain on the radially outer filaments in the rod may exceed the safe limit. A more flexible non-metallic elongate strengthening member that has been proposed and used comprises a plurality of such rods, each having a diameter substantially less than 3 mm, helically laid up around a central such rod of similar size. In this flexible non-metallic elongate strengthening member, stiffness is substantially reduced and, when the strengthening member is wound around the drum, the strain on the radially outer filaments of a rod is reduced by about a factor of 3. However, resin-bonded non-metallic filaments of such a rod are not ductile and one disadvantage of the aforesaid flexible non-metallic elongate strengthening member is that the component rods of the member are liable to spring apart; a more important disadvantage is that, when the flexible strengthening member is in tension, the load is not immediately taken up by all component rods of the flexible strengthening member and, at least initially when tension is applied, the radially outer rods tend to move radially inwardly until the line contacts between the rods becomes sufficiently broad to withstand the inward pressure caused by the applied tension. A "pre-extension" in the stress-strain characteristic is particularly undesirable in an optical cable because an optical fibre has a very limited strain capability.

It is an object of the present invention to provide, for use in an optical cable, an improved non-metallic flexible elongate strengthening member which does not have the aforesaid disadvantages.

It is a further object of the invention to provide an improved optical cable incorporating at least one said improved non-metallic flexible elongate strengthening member, which optical cable is especially, but not exclusively, suitable for use in environments in which it is likely to be subjected to a wide range of temperatures.

According to the first aspect of the invention, the improved non-metallic flexible elongate strengthening member comprises a plurality of non-metallic flexible elements helically laid around a central non-metallic flexible element, each of which flexible elements comprises a multiplicity of filaments of non-metallic reinforcing material bonded together by a heat-softenable organic material and is coated with a release agent, the flexible elements of the assembly being so deformed and compacted together that any tendency for the flexible elements to spring apart is substantially eliminated.

Preferably, the flexible strengthening member comprises six said flexible elements helically laid around a central said flexible element and the flexible elements are so deformed and compacted together that the central flexible element has a transverse cross-sectional shape of approximately hexagonal form and each of the surrounding six flexible elements has a transverse cross-sectional shape approximating to a sector of an annulus.

Each of the filaments of the multiplicity of filaments of non-metallic reinforcing material of each flexible element preferably is made of non-optical glass or an aromatic polyamide such as that sold under the trade name "Kevlar".

The heat-softenable bonding material encapsulating the multiplicity of non-metallic filaments of each flexible element may be a thermoplastics polymer such as polypropylene, nylon or the polyetherketone sold by ICI plc under the trade name "PEEK", or it may be a thermosetting resin which, until the flexible elements of the assembly have been deformed and compacted together, is only partially cured.

The release agent coating each flexible element is preferably a film of silicone oil.

Where the heat-softenable bonding material of each flexible element is a thermoplastics polymer, preferably the flexible element is made by feeding the multiplicity of filaments of non-metallic reinforcing material and a plurality of flexible elongate members of thermoplastics polymer into a heated die where the elongate members of thermoplastics polymer are softened to a sufficient extent that thermoplastics polymer bonds together the multiplicity of non-metalic filaments to form the flexible element. Preferably, each flexible elongate member of thermoplastics material is in the form of a yarn or batt so as to be more readily deformable than a mono-filament or other elongate member of solid cross-section. Vacuum may be applied to the upstream end of the heated die to reduce risk of trapping air.

Deforming of the flexible elements of the assembly and compacting them together is preferably effected by the technique known as "die-forming"; that is to say, the flexible elements are preferably deformed and compacted together by passing the assembly of flexible elements through a closing die, heated to a temperture sufficient to soften the heat-softening bonding material of each flexible element, to effect a reduction in the overall diameter of the assembly to such an extent that the flexible elements are deformed and compacted together.

In a preferred method of making the improved non-metallic flexible elongate strengthening member, the flexible elements are assembled together by means of a stranding machine, preferably of the de-torsioning type, and in their passage to the heated closing die pass through pre-heating tubes which pre-heat each flexible element to a temperature lower than that necessary to soften its heat-softenable bonding material. The release agent is applied to each of the flexible elements preferably at a position upstream of the pre-heating tubes, e.g. by means of pads wetted with the release agent.

According to a further aspect of the invention, we provide an optical cable comprising at least one optical cable element and at least one improved non-metallic flexible elongate strengthening member as hereinbefore described.

The optical cable element may be a separate optical fibre or an optical bundle comprising a group of optical fibres or a group of fibres including at least one optical fibre and at least one non-optical reinforcing fibre or other reinforcing element. A separate optical fibre or separate optical fibres and/or an optical bundle or optical bundles may be supported by a flexible elongate carrier member, eg. a tape or ribbon.

Preferably, the flexible elongate carrier member comprises a tube of rubber or plastics material in which at least one separate optical fibre and/or optical bundle is loosely housed.

The improved non-metallic flexible elongate strengthening member of the present invention is especially suitable for use in the optical cable which is described and claimed in our Patent No. 1601003 and which comprises a plurality of tubes of rubber or plastics material in each of some or all of which is or are loosely housed at least one optical bundle and/or at least one separate optical fibre, which tubes are arranged helically in one or more than one layer around and are so secured to a central elongate strengthening member that relative movement in a lengthwise direction between the tubes and the strengthening member is substantially prevented and, surrounding the assembly, an outer protective sheath.

Figure 2:
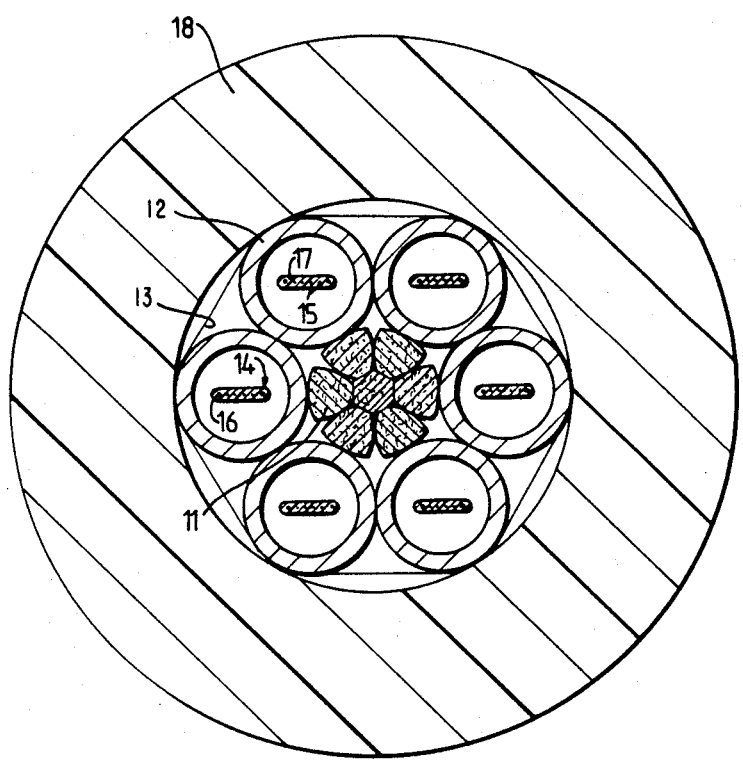

The invention is further illustrated by a description, by way of example, of a preferred non-metallic flexible elongate strengthening member for use in an optical cable, and of a preferred optical cable incorporating the preferred strengthening member, with reference to the accompanying drawings, in which:

FIG. 1 is a transverse cross-sectional view of the preferred strengthening member drawn on a greatly enlarged scale, and FIG. 2 is a transverse cross-sectional view of the preferred optical cable drawn on an enlarged scale.

Referring to FIG. 1, the preferred non-metallic flexible elongate strengthening member comprises six non-metallic flexible elements 2 helically laid around a central non-metallic flexible element 1. Each of flexible elements 1 and 2 comprises a multiplicity of filaments 3 of an aromatic polyamide bonded together by polypropylene 4 and is coated with a film of silicone oil. The flexible elements 1, 2 of the assembly are so deformed and compacted together that the central flexible element 1 has a transverse cross-sectional shape of approximately hexagonal form and each of the surrounding six flexible elements 2 has a transverse cross-sectional shape approximating to a sector of an annulus. By the flexible elements 1, 2 of the assembly being so deformed and compacted together, there is substantially no tendency for the flexible elements to spring apart nor for the stress/strain characteristic of the assembly to have a pre-extension region.

The preferred optical cable shown in FIG. 2 comprises a central non-metallic flexible elongate strengthening member 11, as shown in FIG. 1, around which are helically laid six tubes 12 of polyethylene terephthalate, the tubes being bound so tightly to the central strengthening member by a helically wound binding tape 13 that relative movement in a lengthwise direction between the tubes and the central strengthening member is substantially prevented. In each tube 12 is loosely housed an optical fibre ribbon 14 comprising four optical fibres 15 arranged side by side with their axes lying in a substantially common plane and two non-metallic reinforcing elements 16 arranged on opposite sides of the four optical fibres with the axes of the reinforcing elements lying in the same plane as the axes of the optical fibres, the optical fibres and reinforcing elements being encapsulated in a body 17 of resin. An outer protective sheath 18 of polyethylene surrounds the assembly of central strengthening member 11 and tubes 12.

What we claim as our invention is:

1. A non-metallic flexible elongate strengthening member comprising a plurality of non-metallic flexible elements helically laid around a central non-metallic flexible element, each of which flexible elements comprises a multiplicity of filaments of non-metallic reinforcing material bonded together by a heat-softenable organic material and is coated with a release agent, the flexible elements of the assembly being so deformed and compacted together that any tendency for the flexible elements to spring apart is substantially eliminated.

2. A non-metallic flexible elongate strengthening member comprising six non-metallic flexible elements helically laid around a central non-metallic flexible element, each of which flexible elements comprises a multiplicity of filaments of non-metallic reinforcing material bonded together by a heat-softenable organic material and is coated with a release agent, the flexible elements of the assembly being so deformed and compacted together that the central flexible element has a transverse cross-sectional shape of approximately hexagonal form and each of the surrounding six flexible elements has a transverse cross-sectional shape approximating to a sector of an annulus and that any tendency for the flexible elements to spring apart is substantially eliminated.

3. A non-metallic flexible elongate strengthening member as claimed in claim 1, wherein each of the filaments of the multiplicity of filaments of each flexible element is made of non-optical glass.

4. A non-metallic flexible elongate strengthening member as claimed in claim 1, wherein each of the filaments of the multiplicity of filaments of each flexible element is made of an aromatic polyamide.

5. A non-metallic flexible elongate strengthening member as claimed in claim 1, wherein the heat-softenable bonding material encapsulating the multiplicity of non-metallic filaments of each flexible element is a thermoplastics polymer.

6. A non-metallic flexible elongate strengthening member as claimed in claim 1, wherein the heat-softenable bonding material encapsulating the mulitplicity of non-metallic filaments of each flexible element is a thermosetting resin which, until the flexible elements of the assembly have been deformed and compacted together, is only partially cured.

7. A non-metallic flexible elongate strengthening member as claimed in claim 1, wherein the release agent coating each flexible element is a film of silicone oil.

8. An optical cable comprising at least one optical cable element and in supporting relationship therewith at least one non-metallic flexible elongate strengthening member comprising a plurality of non-metallic flexible elements helically laid around a central non-metallic flexible element, each of which flexible elements comprises a multiplicity of filaments of non-metallic reinforcing material bonded together by a heat-softenable organic material and is coated with a release agent, the flexible elements of the assembly being so deformed and compacted together that any tendency for the flexible elements to spring apart is substantially eliminated.

9. An optical cable as claimed in claim 8 wherein the at least one optical cable element comprises at least one optical fibre supported by a flexible elongate carrier member.

10. An optical cable as claimed in claim 9, wherein the flexible elongate carrier member of the or each optical cable element is a tape.

11. An optical cable as claimed in claim 9, wherein the flexible elongate carrier member of the or each optical cable element comprises a tube of plastics material in which at least one optical fibre is loosely housed.

12. An optical cable comprising a plurality of tubes of plastics material in each of at least some of which is loosely housed at least one optical fibre, which tubes are arranged helically in at least one layer around and are so secured to a central elongate strengthening member that relative movement in a lengthwise direction between the tubes and the strengthening member is substantially prevented and, surrounding the assembly, an outer protective sheath, wherein the central elongate strengthening member comprises a plurality of non-metallic flexible elements helically laid around a central non-metallic flexible element, each of which flexible elements comprises a multiplicity of filaments of non-metallic reinforcing material bonded together by a heat-softenable organic material and is coated with a release agent, the flexible elements of the assembly being so deformed and compacted together that any tendency for the flexible elements to spring apart is substantially eliminated.

* * * * *

UNITED STATES PATENT AND TRADEMARK OFFICE
CERTIFICATE OF CORRECTION

PATENT NO. : 4,709,983

DATED : December 1, 1987

INVENTOR(S) : KARL W. PLESSNER, MICHAEL J. POOLE

It is certified that error appears in the above-identified patent and that said Letters Patent is hereby corrected as shown below:

Column 1, line 26, change the first occurrence of "or" to --of--.

Signed and Sealed this

Twenty-fourth Day of May, 1988

Attest:

DONALD J. QUIGG

*Attesting Officer*  *Commissioner of Patents and Trademarks*